US006811458B2

(12) United States Patent
Kouya (10) Patent No.: US 6,811,458 B2
(45) Date of Patent: Nov. 2, 2004

(54) METHOD FOR MANUFACTURING LIQUID CRYSTAL DISPLAY

(75) Inventor: Akiyoshi Kouya, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 118 days.

(21) Appl. No.: 10/142,287

(22) Filed: May 9, 2002

(65) Prior Publication Data

US 2003/0002004 A1 Jan. 2, 2003

(30) Foreign Application Priority Data

May 10, 2001 (JP) ........................................ 2001-140776

(51) Int. Cl.[7] .............................. H01J 9/00; H01J 9/24; G02F 1/1339; G02F 1/1341
(52) U.S. Cl. .......................... 445/24; 445/25; 349/189; 349/190
(58) Field of Search ..................... 445/24, 25; 349/187, 349/188, 189, 190, 191

(56) References Cited

U.S. PATENT DOCUMENTS 4,779,957 A * 10/1988 Suginoya et al. ........... 349/187
5,952,676 A * 9/1999 Sato et al. .................. 349/190
6,010,384 A * 1/2000 Nishino et al. ............... 445/24

FOREIGN PATENT DOCUMENTS

JP 11-305239 11/1999
KR 2000-71852 11/2000

* cited by examiner

Primary Examiner—Vip Patel
Assistant Examiner—Mariceli Santiago
(74) Attorney, Agent, or Firm—Choate, Hall & Stewart (57) ABSTRACT

An LCD (Liquid Crystal Display) manufacturing method includes: a step of forming a columnar spacer for maintaining a gap between a TFT (Thin Film Transistor) substrate and a CF (Color Filter) substrate into which a liquid crystal is to be injected; and a subsequent step of performing under-pressure hole sealing processing which determines the gap finally, as applying an under-pressure hole sealing load value of 0.15–0.60 kg/cm$^2$.

10 Claims, 10 Drawing Sheets

METHOD FOR MANUFACTURING LIQUID CRYSTAL DISPLAY

BACKGROUND OF THE INVENTION

1. Field of the Invention

The present invention relates to a method for manufacturing a Liquid Crystal Display (LCD) and, more particularly to, a method for manufacturing the LCD in which a columnar spacer is provided to maintain a gap to be filled with liquid crystal between a driver element substrate and a facing substrate.

The present application claims priority of Japanese Patent Application No. 2001-140776 filed on May 10, 2001, which is hereby incorporated by reference.

2. Description of the Related Art

A Liquid Crystal Display (LCD) is widely used as a display for use in a variety of information apparatuses or a like The LCD has a basic configuration in that a gap is filled with liquid crystal between a TFT (Thin Film Transistor) substrate (driver element substrate) on which a Thin Film Transistor (TFT) operating as a driver element (switching element) is formed and a CF (Color Filter) substrate (facing substrate) on which a Color Filter (CF) is formed. In this configuration, conventionally, to maintain the gap between the TFT substrate and the CF substrate, a spherical spacers are disposed between these two substrates.

Figure 9A:
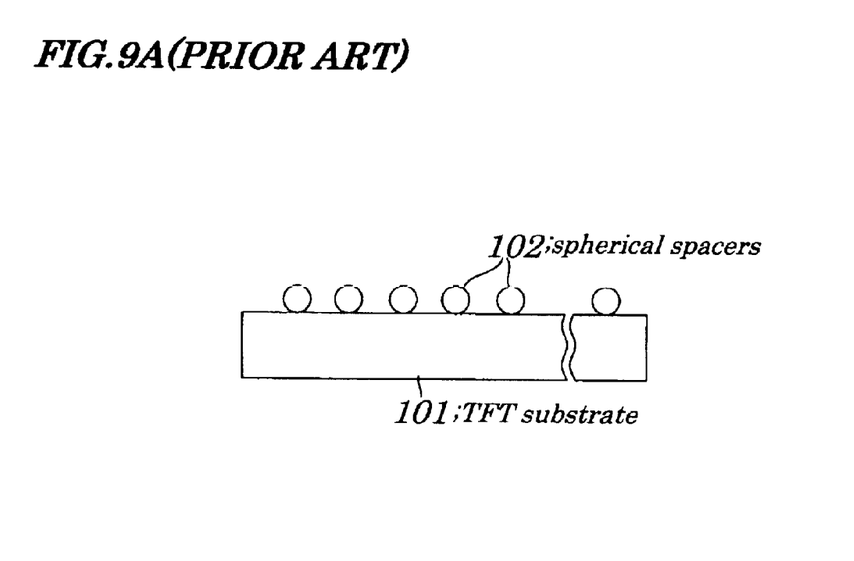
FIGS. 9A and 9B are flow diagrams for schematically showing sequential steps of a conventional LCD manufacturing method using a spherical spacer.
Figure 9B:
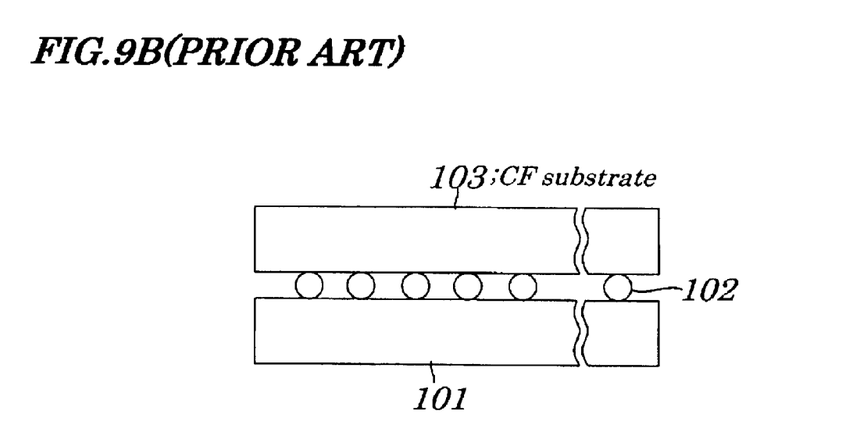

First, as shown in FIG. 9A, on either one of the two substrates, shown as an example, a TFT substrate 101 are distributed spherical spacers 102 prepared beforehand that are made of resin or a like and that have a diameter of 4–8 $\mu$m Then, as shown in FIG. 9B, a CF substrate 103 is superposed over the TFT substrate 101 in such a manner as to come in contact with the spherical spacers 102, so that these two substrates are adhered to each other to thereby form a liquid crystal cell. In this case, the TFT substrate 101 and the CF substrate 103 are supposed to have been mounted with necessary components (elements) such as TFTs and CFs (they are not shown in the drawing for simplification) formed thereon already. Then, liquid crystal (not shown) is injected between the TFT substrate 101 and the CF substrate 103 of the liquid crystal cell, to which is then connected a peripheral driver circuit (not shown), thus completing the LCD.

Thus, according to the method for manufacturing the LCD using spherical spacers 102, as mentioned above, the spherical spacers 102 only need to be distributed on said either one of the two substrates, that is the TET substrate 101, thus giving a merit of a simplified step of providing the spherical spacers 102. Oppositely, however, by this method, the spherical spacers 102 are distributed randomly on the TFT substrate 101, so that they are not uniform in dispersion density (disposition density) and, because of their spherical shape, are liable to roll (move) on the TFT substrate 101 during manufacture, thus giving a problem that they may readily move around to thereby deteriorate a so-called an "on-the-surface uniformity" Also, the spherical spacers 102 are present in some display picture elements, thus inevitably deteriorating contrast of the LCD.

Figure 10A:
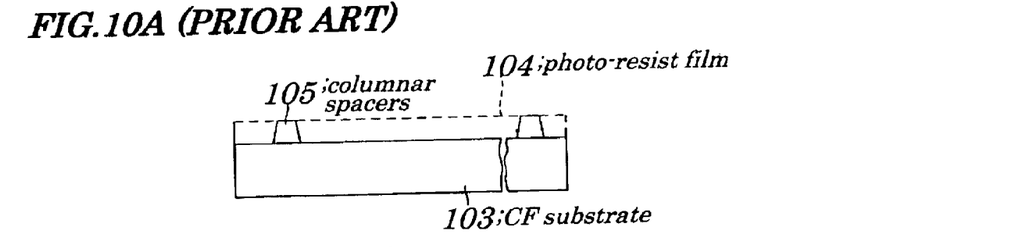
FIGS. 10A, 10B, 10C, and 10D are flow diagrams for schematically showing sequential steps of another conventional LCD manufacturing method using a columnar spacer.

To solve these problems, a recent LCD has, in place of the spherical spacers 102, columnar spacers disposed between the TFT substrate 101 and the CF substrate 103. For example, Japanese Patent Application Laid-open No. Hei 11-305239 discloses an LCD (shown in FIGS. 11A to 11B) having such a configuration that columnar spacers 105 are disposed between the TFT substrate 101 and the CF substrate 103. These columnar spacers 105 are typically formed on the CF substrate 103 by using the same material as the color filter and at the same time as, for example, this color filter is formed The following will roughly describe a method for manufacturing a conventional LCD employing the columnar spacer 105 with reference to FIGS. 10A to 10D First, as shown in FIG. 10A, a photo-resist film 104 mainly made up of an acrylic resin is coated on such a surface of, for example, the CF substrate 103 on which necessary components are formed beforehand as to face the TFT substrate 101 and then exposed, developed, and patterned to form the columnar spacers 105. The columnar spacers 105 are thus formed as fixed on the CF substrate 103. The columnar spacers 105, therefore, do not vary in disposition density like the spherical spacers 102 nor move around on the CF substrate 103 when manufactured, thus avoiding deteriorating the on-the-surface uniformity. Moreover, the columnar spacers 105 can be disposed at an arbitrary position and be adjusted not to be present in a display picture element, thus giving a merit of avoiding deteriorating the contrast.

Figure 10B:
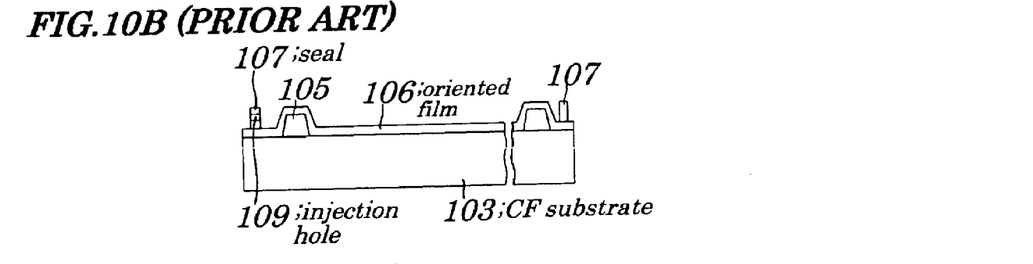

Next, as shown in FIG. 10B, an oriented film 106 made up of, for example, polyimide with a solvent added is formed throughout on the CF substrate 103 by printing. Then, to remove the solvent from the inside of the oriented film 106, orientation baking processing is performed on the CF substrate 103

Figure 10C:
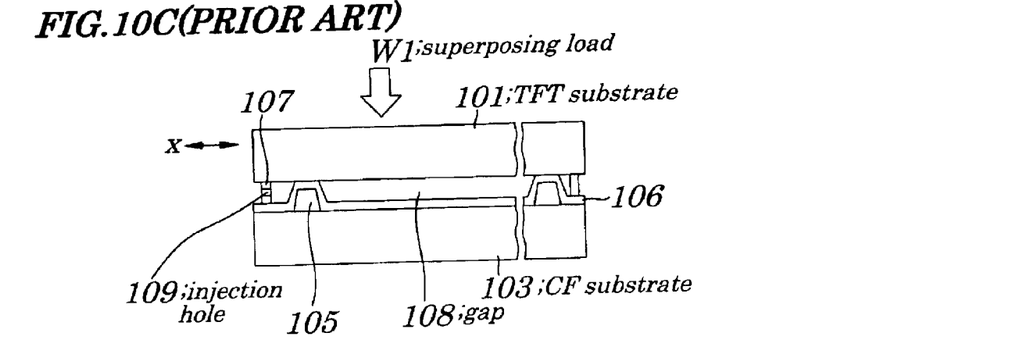

Then, a seal 107 made up of, for example, epoxy-resin is formed by printing at a predetermined position of the oriented film 106. In the side surface of the seal 107 is formed an injection hole 109 for injecting liquid crystal therethrough., On the other hand, as shown in FIG. 10C, the TFT substrate 101 on which necessary components including TFTs are formed beforehand is superposed over the CF substrate 103 in such a manner as to be in contact with the columnar spacers 105. In this superposition, the TFT substrate 101 is aligned by, specifically, shifting the TFT substrate 101 laterally with respect to the columnar spacers 105 so as to give a predetermined positional relationship between the TFT substrate 101 and the CF substrate 103 by applying a predetermined superposing load W1 on the TFT substrate 101 and the CF substrate 103. Conventional superposition values are roughly the same as those when the spherical spacer 102 is employed, where they are aligned with each other by crushing the seal 107 when applying the superposing load W1 of 0.3–0.6 kg/cm$^2$. Then, seal baking processing is performed by heating the seal 107 to harden the columnar spacers 105 while applying seal baking load W2 (not shown) or about 0.5 kg/cm$^2$, which is roughly the same value as that by use of spherical spacers 102, across these the TFT substrate 101 and the CF substrate 103 thus superposed one over the other. By doing so, a gap 108 is maintained between the TFT substrate 101 and the CF substrate 103 due to the columnar spacers 105, thus forming a liquid crystal cell.

Figure 10D:
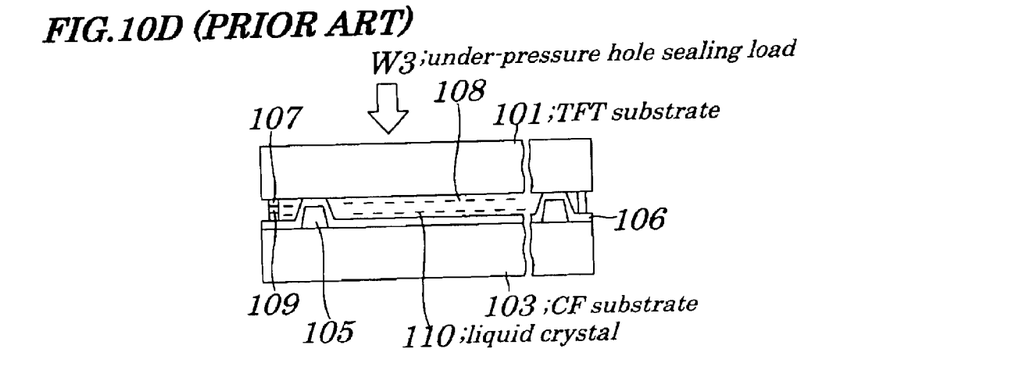

Next, as shown in FIG. 10D, liquid crystal 110 is injected through the injection hole 109 in the seal 107 to then perform under-pressure hole sealing processing for determining the gap 108 finally. This under-pressure hole sealing is carried out specifically by expelling extra liquid crystal from the inside of the liquid crystal cell and also as applying an under-pressure hole sealing load W3 of at least about 0.6 kg/cm$^2$ to make the gap 108 uniform. Subsequently, a peripheral driver circuit (not shown) is connected to the liquid crystal cell, thus completing the LCD.

This conventional method for manufacturing the LCD, however, has a problem that it is difficult to form a stable gap 108 using columnar spacers 105 because these columnar spacers 105 are affected by the heat or the load from the manufacturing process after they are formed.

Figure 11A:
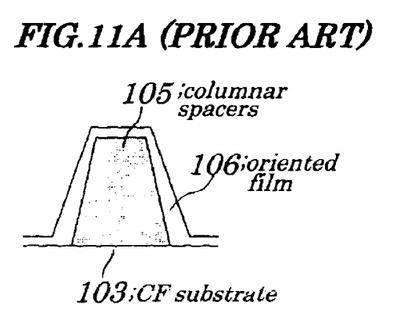
FIGS. 11A and 11B are illustrations for showing a state where the columnar spacer is affected by orientation baking processing by the conventional LCD manufacturing method.
Figure 11B:
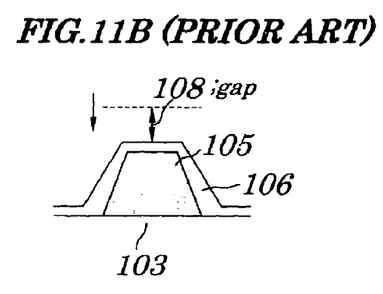

First, after being formed, the columnar spacers 105 shrink owing to the heat produced by the processing of an orientation baking process, thus being decreased in height. As shown in FIG. 11A, when the columnar spacers 105 are formed on the CF substrate 103 and the oriented film 106 is printed throughout the surface and then the orientation baking processing is performed, the resultant heat affects the columnar spacers 105 so that they would be fixed as shrunk as shown in FIG. 11B, thus the gap 108 formed between them and the TFT substrate 101 narrowing.

Figure 12A:
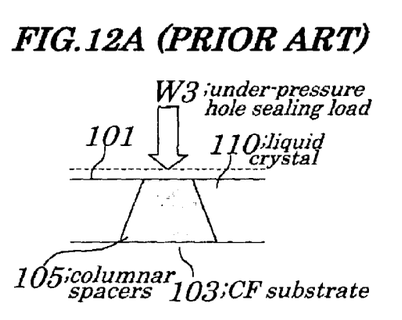
FIGS. 12A, 12B, and 12C are illustrations for showing a state where the columnar spacer is affected by under-pressure hole sealing load in the conventional LCD manufacturing method.
Figure 12B:
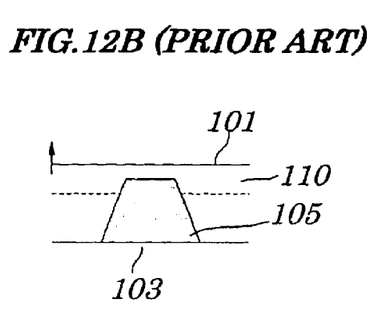

Also, although in the under-pressure hole sealing process to determine the gap 108 finally, in order to make the gap 108 uniform, preferably a large under-pressure hole sealing load is applied to expel the extra liquid crystal 110, this large under-pressure hole sealing load has such an influence that when the temperature of an environment in which the LCD is used is changed, the shrinkage of the columnar spacers 105 cannot keep pace with the shrinkage of the volume of the liquid crystal 110. As shown in FIG. 12A, if the large under-pressure hole sealing load W3 (for example, 0.6 kg/cm$^2$) is applied in under-pressure hole sealing, the columnar spacers 105 are compressed. If, in this case, the columnar spacers 105 are sufficiently compressed already as shown in FIG. 12A, they can keep pace in expansion with the liquid crystal 110 even when the environmental temperature is raised (to, for example, 70–80° C.), thus maintaining a uniform gap 108. If the liquid crystal 110 expands more than this preceding compression degree of the columnar spacers 105, however, as shown in FIG. 12B, the columnar spacers 105 cannot keep pace in expansion with the liquid crystal 110 in an arrow direction and so are separated from the TFT substrate 101, thus making it impossible to maintain a uniform gap.

Figure 12C:
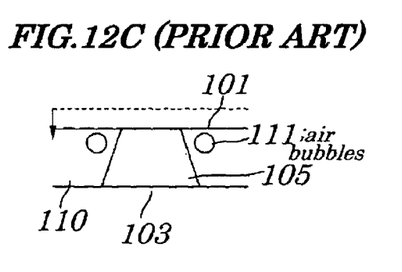

In a case where the environmental temperature is lowered (to, for example, −10° C. through −20° C.), on the other hand, when the columnar spacers 105 are sufficiently compressed already as mentioned above and if the liquid crystal 110 shrinks in the arrow direction as shown in FIG. 12C, the columnar spacers 105 cannot be compressed any more and so cannot keep pace with the liquid crystal 110 in shrinkage. As a result, a gas contained in the liquid crystal 110 gives rise to air bubbles 111, which in turn deteriorates transmittance of light.

If the large under-pressure hole sealing load is thus applied to seal the hole under pressure, the columnar spacers 105 cannot keep pace with the liquid crystal 110 in expansion or shrinkage when the environment in which a finished LCD is used is exposed to a temperature which is higher or lower than the ordinary (room) temperature respectively, thus making it difficult to form a uniform gap Also, by the conventional method for manufacturing the LCD, the columnar spacers 105 are affected by the heat or pressure applied in the manufacturing process after they are formed, thus making it difficult to manufacture a high-quality LCD.

Figure 13A:
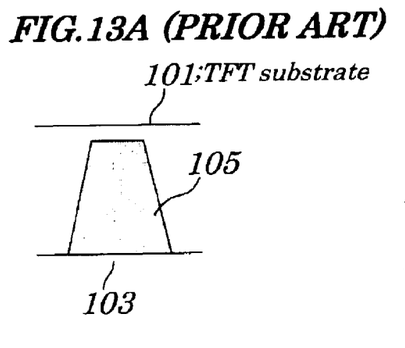
FIGS. 13A and 13B are illustrations for showing a state where the columnar spacer is affected by a superposing load in the conventional LCD manufacturing method.
Figure 13B:
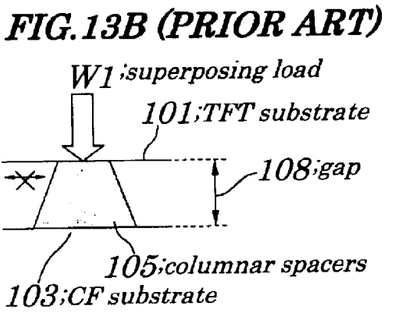

That is, if the TFT substrate 101 and the CF substrate 103 are superposed one over the other while applying the large superposing load in the superposing process, they cannot easily be aligned with each other. If, as shown in FIG. 13A, the TFT substrate 101 is disposed and then, as shown in FIG. 13B, the large superposing load W1 (of, for example, 0.3–0.6 kg/cm$^2$) is applied thereon, resultantly the TFT substrate 101 has a large friction force against the columnar spacers 105 on the CF substrate 103. This makes it difficult to shift the TFT substrate 101 laterally, which in turn makes it difficult to align these substrates (TFT substrate 101 and CF substrate 103) with each other, so that if the TFT substrate 101 is forcedly slipped, its surface may be damaged by the columnar spacers 105, thus possibly deteriorating the TFTS, the oriented film 106, or a like formed on that surface The deterioration, therefore, decreases the manufacture yield of the LCD, thus making it difficult to consistently manufacture a high-quality LCD.

Figure 14A:
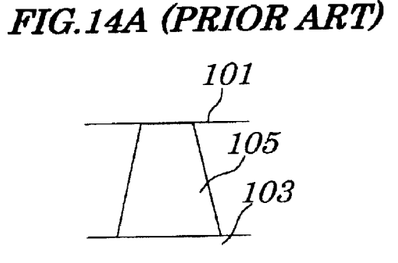
FIGS. 14A, 14B, and 14C are illustrations for showing a stale where the columnar spacer is affected by seal baking load in the conventional LCD manufacturing method.
Figure 14B:
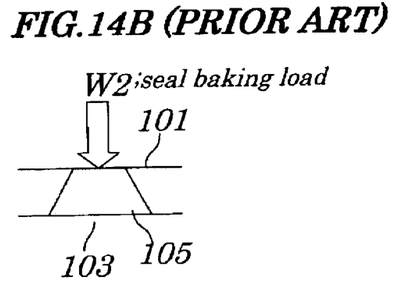
Figure 14C:
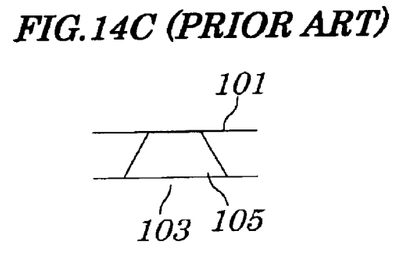

Also, since the seal baking process following the superposing process involves not only pressure application due to seal baking load but also heating, resultantly the columnar spacers may be deformed readily. The columnar spacers 105 before seal baking such as shown in FIG. 14A, are subject to a drop in hardness in seal baking owing to application of the seal baking load W2 and the heat as shown in FIG. 14B and so readily deformed, thus being left as deformed even after seal baking as shown in FIG. 14C. In this case also, a uniform gap cannot be maintained

SUMMARY OF THE INVENTION

In view of the above, it is an object of the present invention to provide an LCD manufacturing method that can form a stable gap using columnar spacers and also that can manufacture a high-quality LCD.

According to a first aspect of the present invention, there is provided a method for manufacturing an LCD including a driver element substrate on which a driver element is formed and a facing substrate which faces the driver element substrate, into a gap between which is injected liquid crystal, a columnar spacer for maintaining the gap being disposed between the driver element substrate and the facing substrate, including;

a columnar spacer forming step for forming the columnar spacer on either one of the driver element substrate and the facing substrate;

a seal forming step for forming a seal for adhering the driver element substrate and the facing substrate to each other after the columnar spacer is formed;

a liquid crystal injecting step for injecting the liquid crystal through an injection hole formed in the seal beforehand after the driver element substrate and the facing substrate are adhered to each other by the seal; and an under-pressure hole sealing step for sealing the injection hole after an extra amount of the liquid crystal is expelled through the injection hole, to then apply an under-pressure hole sealing load value of 0.15–0.60 kg/cm$^2$ across the driver element substrate and the facing substrate in order to determine the gap finally.

In the foregoing, a preferable mode is one wherein between the seal forming step and the liquid crystal injecting step is interposed a superposing step for applying a superposing load value of 0.03–0.12 kg/cm$^2$ across the driver element substrate and the facing substrate to crush the seal in order to adhere the driver element substrate and the facing substrate to each other.

Another preferable mode is one wherein the superposing step is followed by a seal baking step for baking the seal by applying across the driver element substrate and the facing substrate a seal baking load value less than the under-pressure hole sealing load value employed in the under-pressure hole sealing step.

Still another preferable mode is one wherein the columnar spacer forming step is followed by an oriented film forming step for forming an oriented film to cover the columnar spacer.

Further preferable mode is one wherein the oriented film forming step is followed by an oriented film baking step for baking the oriented film to remove a solvent therefrom.

Still further preferable mode is one wherein the oriented film baking step is performed at a temperature of 150–230° C. for one to three hours.

An additional preferable mode is one wherein the columnar spacer forming step is performed by applying a photo-resist film on said either one of the driver element substrate or the facing substrate to then pattern the photo-resist film into a desired shape.

Still additional preferable mode is one wherein the photo-resist film employed is of a negative type.

Further preferable mode is one wherein the columnar spacer is formed in a light-blocking region.

Still further position of the light-blocking region is selected in a region where a black matrix layer is formed.

With the above configurations, the columnar spacer is formed for maintaining the gap between the driver element substrate and the facing substrate to be filled with the liquid crystal to then perform the under-pressure hole sealing processing which determines the gap finally at the under-pressure hole sealing load value of 0.15–0.60 kg/cm$^2$, so that even when an environment in which a finished LCD is used is exposed to a high or low temperature other than a ordinary (room) temperature, the columnar spacer can keep pace with the liquid crystal in expansion and shrinkage, thus making it to form a uniform gap.

Therefore, it is possible to form a stable gap by use of the columnar spacer and also to manufacture a high-quality LCD.

BRIEF DESCRIPTION OF THE DRAWINGS

The above and other objects, advantages, and features of the present invention will be more apparent from the following description taken in conjunction with the accompanying drawings, in which.

DESCRIPTION OF THE PREFERRED EMBODIMENT

Best mode of carrying out the present invention will be described in further detail using various embodiments with reference to the accompanying drawings.

First Embodiment

Figure 1A:
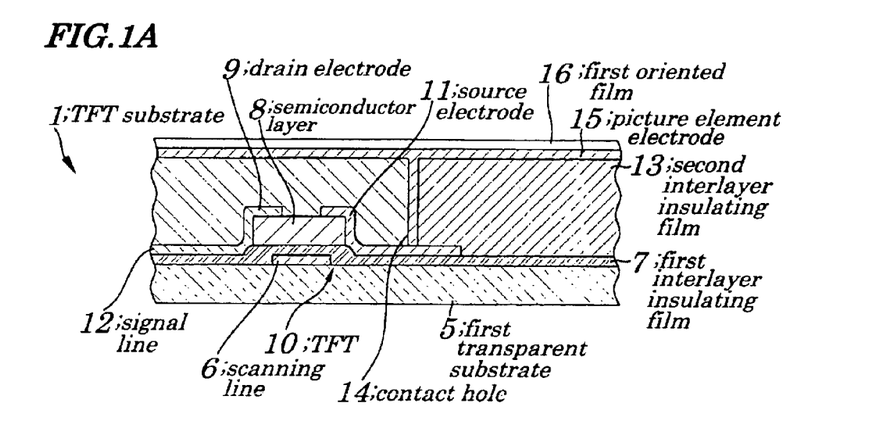
FIGS. 1A, 1B, and 1C are flow diagrams for showing sequential steps in an LCD manufacturing method according to a first embodiment of the present invention.

FIGS. 1A to 1F, and 2 are flow diagrams for showing subsequent sequential steps in manufacturing a transmission-type LCD according to the first embodiment of the present invention First, as shown in FIG. 1A, a TFT substrate 1 on which a TFT 10 is formed beforehand is provided. This TFT substrate 1 includes: a first transparent substrate 5 which is made of glass or a like, a scanning line (gate line) 6 which is formed at a part of a surface of the first transparent substrate 5 to thereby serve also as a gate electrode; a first interlayer insulating film 7 which is formed to cover the scanning line 6 so as to serve also as a gate insulating film; a semiconductor layer 9 which is formed on the first inter layer insulating film 7 over the scanning line 6; a drain electrode 9, and a source electrode 11 which are formed at respective ends of the semiconductor layer 8; a signal line 12 which is formed to be connected to the drain electrode 9 in such a manner as intersecting perpendicularly with the scanning line 6; a second interlayer insulating film 13 which is formed to cover the semiconductor layer 8, the drain electrode 9, the source electrode 11, and a like; a picture element electrode 15 which is formed on a surface of the second interlayer insulating film 13 and which is connected to the source electrode 11 via a contact hole 14 formed in the second interlayer insulating film 13; and a first oriented film 16 which is formed to cover the picture element electrode 15. Of these the scanning line 6, the semiconductor layer 8, the drain electrode 9, and the source electrode 11 making up the TFT 10.

Figure 1B:
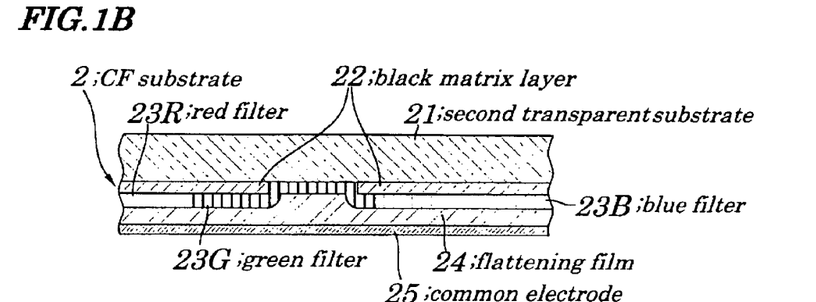

Next, as shown in FIG. 1B, a CF substrate 2 to be arranged so as to face the TFT substrate 1 is provided. The CF substrate 2 includes: a second transparent substrate 21 made of glass or the like; a black matrix layer 22 which is formed on a surface of the second transparent substrate 21 to function as a light-blocking film for preventing light incidence upon the TFT 10 on the TFT substrate 1 or for blocking a display-unrelated portion from light; a red filter 23R, a green filter 23G, and a blue filter 23B which make up e a color filter; a flattening film 24 which is formed to cover the black matrix layer 22 and the red filter 23R, the green filter 23G, and the blue filter 23B; and a common electrode 25 which is formed to cover the flattening film 24.

Figure 1C:
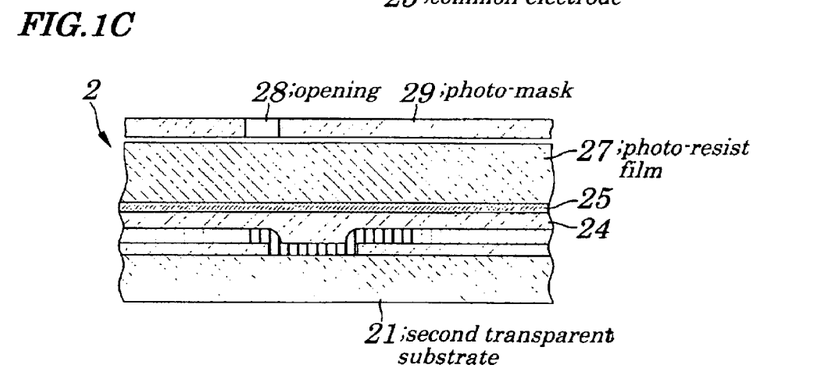

Next, as shown in FIG. 1C, a negative photo-resist film 27 mainly made up of acrylic resin is coated throughout such a side surface of the CF substrate 2 so as to face the TFT substrate 1 and then is covered by a photo-mask 29 having an opening 28 formed therein at a position where a columnar spacer 30 (shown in FIG. 1D) is to be formed. Next, the negative photo-resist film 27 is exposed to ultraviolet ray through the photo-mask 29 for exposure and then the photo-mask 29 is removed.

Figure 1D:
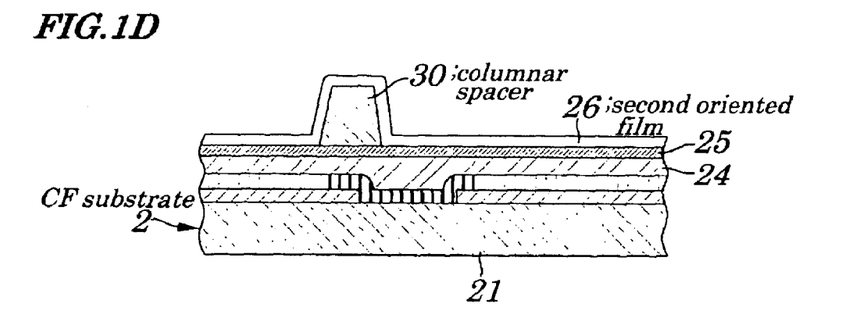
FIGS. 1D, 1E, and 1F are flow diagrams for showing subsequent sequential steps in the LCD manufacturing method of the first embodiment.
Figure 7:
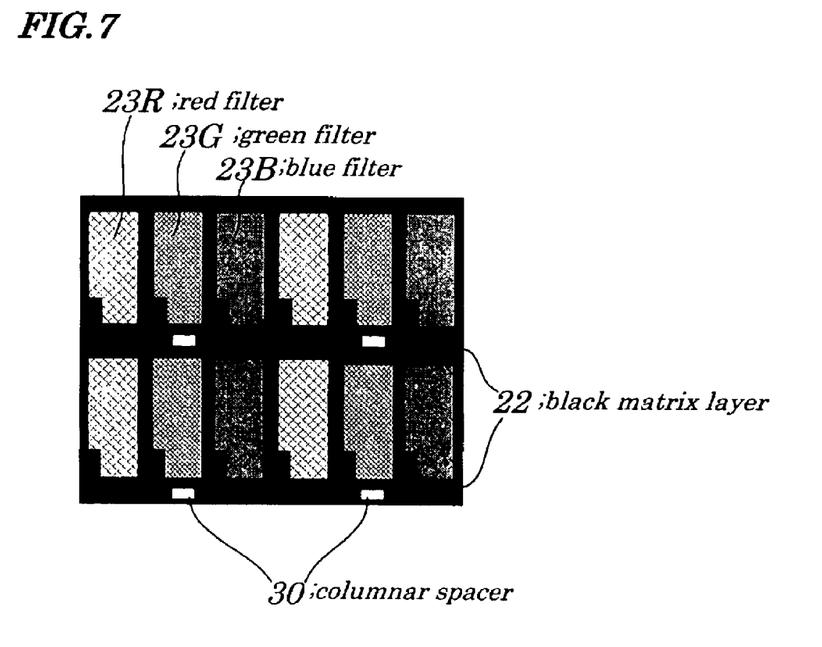
FIG. 7 is a plan view for schematically showing an example of a region where the columnar spacer is disposed in the LCD manufacturing method of the first embodiment.

Next, the CF substrate 2 is dipped into a developer to develop the negative photo-resist film 27 in order to remove the negative photo-resist film 27 other than those portions thereof that were irradiated with ultra-violet ray through the opening 28 in the photo-mask 29, thus forming the columnar spacer 30 as shown in FIG. 1D. The columnar spacer 30 is formed as fixed on the common electrode 25. Specifically, the columnar spacer 30 is formed outside the display picture elements, for example, as shown in FIG. 7, in a region on the black matrix layer 22, in order not to affect the optical transparency. In one example, the columnar spacer 30 was formed to have a height of 4.45 $\mu$m and an area of 10×12 $\mu$m$^2$. Also, by using, in particular, the negative photo-resist film 27, the columnar spacer 30 can be processed with a high accuracy.

Next, as shown in FIG. 1D, a second oriented film 26 is formed by printing a polyimide (PI) film with a film thickness of 0.040–0.050 $\mu$m throughout the surface of the CF substrate 2 including the columnar spacer 30. At this stage in the process, the columnar spacer 30 has a height of about 4.5 $\mu$m. Then, to remove such a solvent as a polyamic acid from the second oriented film 26, heat treatment is conducted on the CF substrate 2 at 150–230° C. for one to three hours for an orientation baking processing. In the orientation baking processing, with the manufacturing method according to the embodiment, heat treatment conditions are selected from the above-mentioned range, so that non-polymerized and unhardened negative photo-resist film 27 mainly made up of acrylic resin of the columnar spacer 30 can be completely polymerized and hardened At this stage, therefore, the columnar spacer 30 shrinks little. At this stage, the columnar spacer 30 stands at about 4.29 $\mu$m.

Figure 1E:
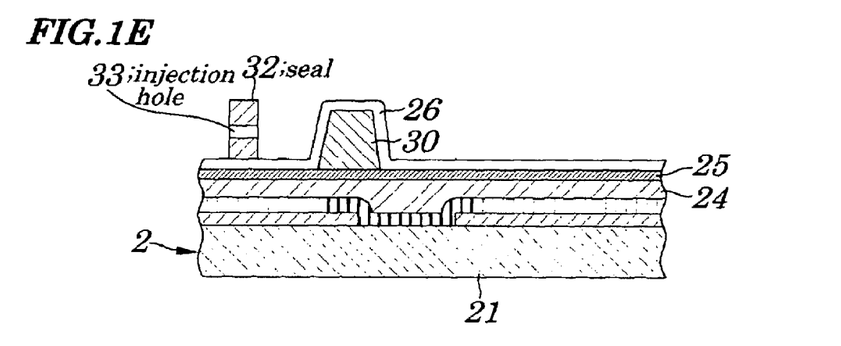

Next, a series of rubbing processes are performed on the second oriented film 26 including rubbing, rubbing washing, rubbing drying, and a like to then print, for example, epoxy resin at a predetermined position on the CF substrate 2 as shown in FIG. 1E in order to form a seal 32, thus completing the CF substrate 2. This seal 32 is used to adhere the TFT substrate 1 and the CF substrate 2 to each other. Also, on the first oriented film 16 on the TFT substrate 1 shown in FIG. 1A, the same series of rubbing processes as described above are performed, to complete the TFT substrate 1.

Figure 1F:
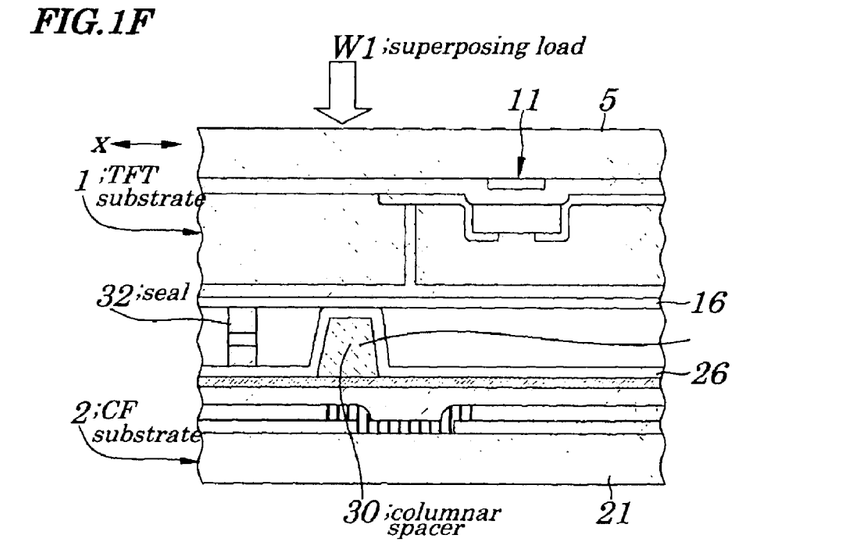

Next, as shown in FIG. 1F, thus formed TFT substrate 1 is superposed over thus formed CF substrate 2 in contact with the columnar spacer 30. Specifically, as applying the following value of a superposing load W1 across the TFT substrates 1 and the CF substrate 2 to crush seal 32, the TFT substrate 1 is shifted with respect to the columnar spacer 30 in a horizontal direction X for such alignment that the TFT substrate 1 and the CF substrate 2 may be in a predetermined positional relationship.

That is, the TFT substrate 1 and the CF substrate 2 were superposed one over the other by setting the superposing load W1 at five values of 0.03 kg/cm$^2$, 0.12 kg/cm$^2$, 0.18 kg/cm$^2$, 0.24 kg/cm$^2$, and 0.60 kg/cm$^2$. The results are given in Table 1 below.

TABLE 1

| Superposing load (kg/cm$^2$) | 0.03 | 0.12 | 0.18 | 0.24 | 0.60 |
|---|---|---|---|---|---|
| (1) Superposition operation | ○ | ○ | Δ | X | X |
| (2) Seal shift | ○ | ○ | ○ | X | X |
| (3) Scar | ○ | ○ | X | — | — |

Table 1 ranks degrees of (1) superposing operation, (2) seal shift, and (3) scar for each values of the superposing load W1 according to how they are performed or occurred. In Table 1, ○ indicates that the item is not problematic, Δ indicates that the item is a little problematic, and X indicates that the item is problematic, so that the item with ○ is considered to be acceptable, to permit a product in process to be sent to the next manufacturing process.

As is clear from Table 1, only in the cases of the two superposing load w1 values of 0.03 kg/cm$^2$ and 0.12 kg/cm$^2$, none of (1) superposition operation, (2) seal shift, and (3) scar were problematic The other cases of the three superposing load w1 values of 0.18 kg/cm$^2$, 0.24 kg/cm$^2$, and 0.60 kg/cm$^2$ were problematic because the superposing operation was impossible to perform, the superposing operation was performed but took a long time, or the seal shifted to scar a display portion such as the TFT, the oriented film, or a like. That is, this embodiment shows that if at least superposing load w1 of 0.18 kg/cm$^2$ is applied in superposition, a conventional defect occurs.

Therefore, when superposing load w1 of not more than 0.12 kg/cm$^2$, preferably 0.03–0.12 kg/cm$^2$, is applied in superposition, a uniform gap can be formed. By doing so, in superposition, there is no possibility of damaging the TFT 10, the first oriented film 16, or the like formed on the surface of the TFT substrate 1, thus facilitating the manufacture of a high-quality LCD without deteriorating manufacturing yield thereof.

Figure 3A:
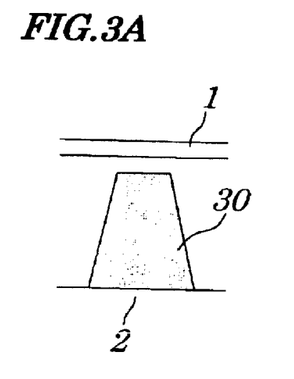
FIGS. 3A, 3B, and 3C are illustrations for showing a state where a columnar spacer is not affected by superposing load in the LCD manufacturing method of the first embodiment.
Figure 3B:
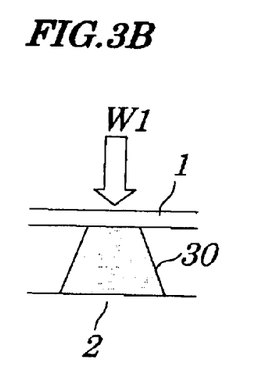
Figure 3C:
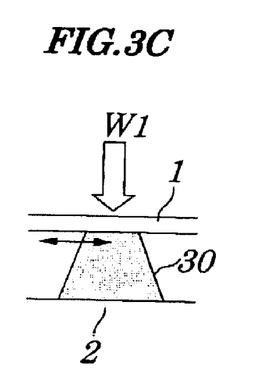

FIGS. 3A, 3B, and 3C are illustrations for showing a state where a columnar spacer is not affected by superposing load in the LCD manufacturing method of the first embodiment.

The columnar spacer 30 before being superposed as shown in FIG. 3A has a small friction force even wren an initial pressure is applied thereon by the superposing load W1 as shown in FIG. 3B, so that as shown in FIG. 3C the TFT substrate 1 can be smoothly shifted laterally with respect to the columnar spacer 30. With this, therefore, as mentioned above, the TFT substrate 1 and the CF substrate 2 can be aligned with each other easily and so the TFT substrate 1 need not be shifted forcedly, so that the columnar spacer 30 does not damage the surface of the TFT substrate 1.

Figure 6:
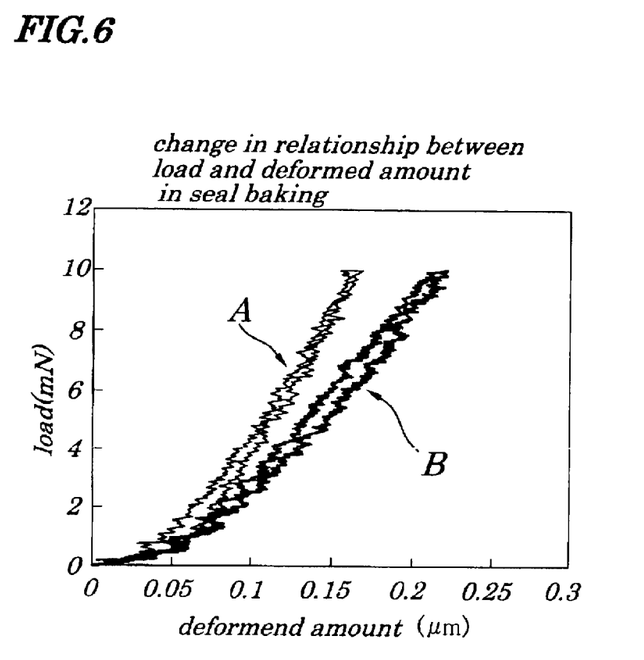
FIG. 6 is a graph for showing a relationship between load applied on the columnar spacer (vertical axis) and a deformed amount (horizontal axis) when seal baking is performed, and when it is not performed by the LCD manufacturing method according to the first embodiment.

Next, while applying a predetermined value of seal baking load across the TFT substrate 1 and the CF substrate 2 as aligned with each other, the seal 32 is heated to harden the columnar spacer 30 in a seal baking processing, thus forming a liquid crystal cell. To avoid the conventional defect from occurring, in this seal baking processing the value of seal baking load is to be selected smaller than that of the under-pressure hole sealing load selected in the following under-pressure hole sealing step that determines the gap. By this step, the elastic characteristics of the columnar spacer 30 are not deteriorated any more, so that it is deformed less. In one example, in the seal baking processing, the seal baking load of about 0.46 kg/cm$^2$ was applied at a baking temperature of about 150° C., whereupon the columnar spacer 30 stood about 4.15 μm. FIG. 6 is a graph for showing a relationship between load applied on the columnar spacer 30 (vertical axis) and a deformed amount (horizontal axis) when seal baking is performed and when it is not performed. As shown in FIG. 6, a curve A indicates characteristics when the seal baking processing was performed and a curve B, those when the seal baking processing was not performed.

As is clear from FIG. 6, even with the same load being applied, the curve A with the case of seal baking being performed exhibits a smaller deformed amount than the curve B with the case of seal baking not being performed, thus indicating that the higher the hardness, the less is deformed the columnar spacer 30.

Figure 4A:
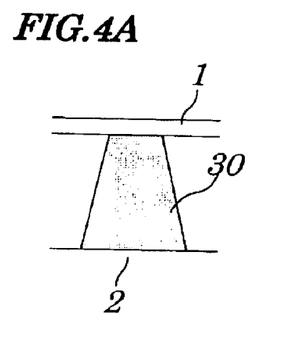
FIGS. 4A, 4B, and 4C are illustrations for showing a state where the columnar spacer is not affected by seal baking in the LCD manufacturing method of the first embodiment.
Figure 4B:
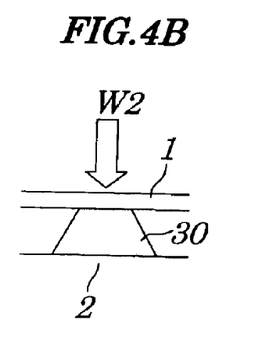
Figure 4C:
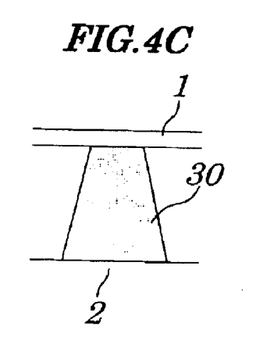

FIGS. 4A, 4B, and 4C are illustrations for showing a state where a deformed amount of the columnar spacer 30 is becomes less by optimization for seal baking.

The columnar spacer 30 before seal baking as shown in FIG. 4A can be minimized in a deformed amount by performing low-load seal baking processing as shown in FIG. 4B, so that as shown in FIG. 4C the columnar spacer 30 after the seal baking processing has nearly the same deformed amount as that before it. With this, a uniform gap can be maintained.

Figure 2:
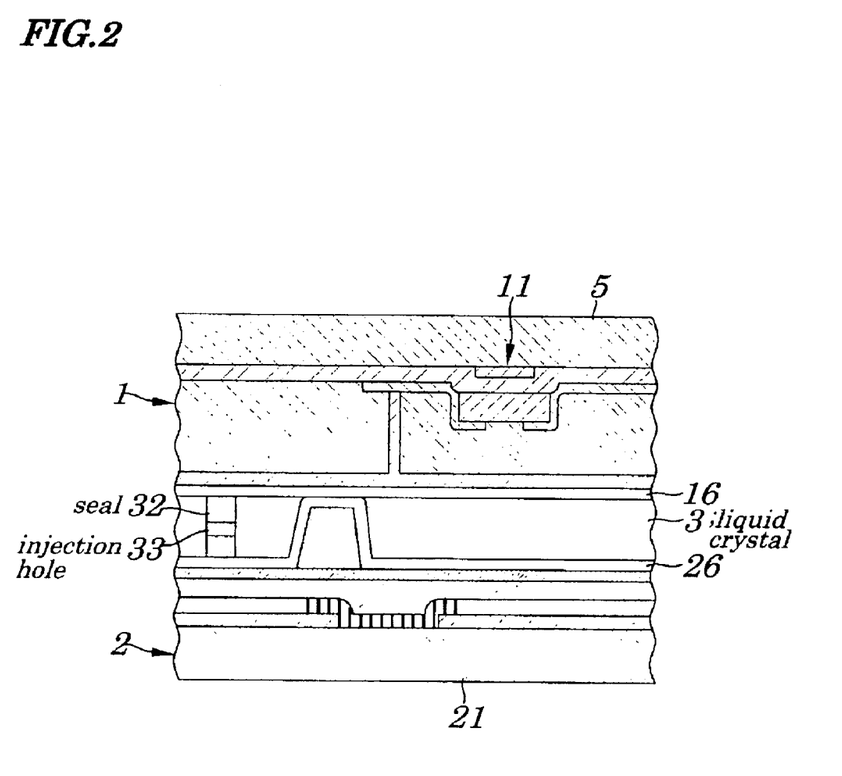
FIG. 2 is a flow diagram for showing a subsequent step of the LCD manufacturing method of the first embodiment.

Next, as shown in FIG. 2, liquid crystal 3 is injected through an injection hole 33 formed in the side surface of the seal 32 beforehand, which injection hole 33 is then sealed under pressure, thus determining the gap finally. This under-pressure hole sealing processing was performed at the following values of the under-pressure hole sealing load, to expel extra liquid crystal 3 in the liquid crystal cell and also to maintain a uniform gap.

That is, in the under-pressure hole sealing processing, the under-pressure hole sealing load was set at seven values of 0 kg/cm$^2$, 0.10 kg/cm$^2$, 0.15 kg/cm$^2$, 0.30 kg/cm$^2$, 0.60 kg/cm$^2$, 0.75 kg/cm$^2$, and 0.80 kg/cm$^2$. The results obtained are given in Table 2 below.

As is clear from Table 2, the manufactured LCD was unproblematic as a commercial product only when the under-pressure hole sealing processing was performed at the three under-pressure hole sealing load values of 0.15 kg/cm$^2$, 0.30 kg/cm$^2$, and 0.60 kg/cm$^2$. When any of the other our values of 0 kg/cm$^2$, 0.10 kg/cm$^2$, 0.75 kg/cm$^2$, and 0.80 kg/cm$^2$ was used as the under-pressure hole sealing load, such a product problem occurred that the on-the-surface uniformity was poor depending on the environmental temperature, that the gap became non-uniform to change the display color tint, or that an air bubble was generated. That is, this embodiment shows that the conventional defect occurred if the hole was sealed under the under-pressure hole sealing load of not more than 0.10 kg/cm$^2$ or not less than 0.75 kg/cm$^2$.

Therefore, by setting the load at a value in a range of 0.15–0.60 kg/cm$^2$ in the under-pressure hole sealing, even when the environment in which a finished LCD is used is exposed to a high or low temperature other than the ordinary temperature, the columnar spacer 30 can keep pace with the LCD in expansion and shrinkage, thus making it easy to form a uniform gap.

Figure 5A:
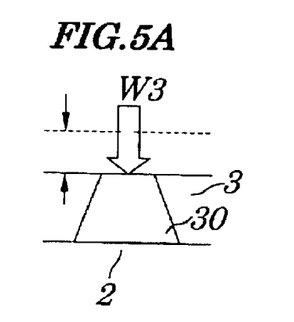
FIGS. 5A, 5B, and 5C are illustrations for showing a state where the columnar spacer is not affected by under-pressure hole sealing by use of a seal in the LCD manufacturing method of the first embodiment.
Figure 5B:
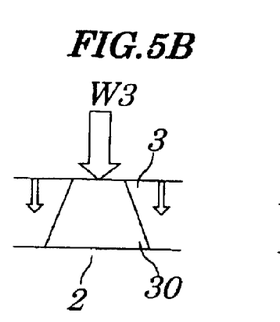
Figure 5C:
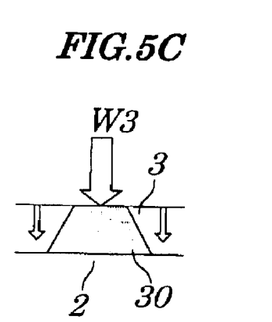

FIGS. 5A, 5B, and 5C are illustrations for showing a state where the columnar spacer is not affected by under-pressure hole sealing by use of a seal in the LCD manufacturing method of the first embodiment. As shown in FIG. 5A, when the above-mentioned under-pressure hole sealing load W3 is applied in the under-pressure hole sealing processing, the columnar spacer 30 is compressed from a broken line down to a solid line. If the environmental temperature rises (for example, to 70–80° C.) in this case, the columnar spacer 30 is sufficiently compressed already, so that elastic characteristics of the columnar spacer 30 permits itself to keep pace with the liquid crystal 3 in expansion, thus maintaining a uniform gap. If the liquid crystal 3 expands more than the columnar spacer 30 was compressed, the columnar spacer 30 is already sealed under pressure at an optimal under-pressure hole sealing load, so that it can keep pace with the liquid crystal 3 in expansion and therefore will not be separated from the TFT substrate 1, thus maintaining a uniform gap.

If the environmental temperature is lowered (for example, to −10° C. through −20° C.), on the other hand, the columnar

TABLE 2

| Under-pressure hole sealing pressure | 0 kg/cm$^2$ | 0.10 kg/cm$^2$ | 0.15 kg/cm$^2$ | 0.30 kg/cm$^2$ | 0.60 kg/cm$^2$ | 0.75 kg/cm$^2$ | 0.80 kg/cm$^2$ |
|---|---|---|---|---|---|---|---|
| (1) ordinary temperature | Poor on-the-surface uniformity | ○ | ○ | ○ | ○ | ○ | Column once shifted not returned due to friction with facing substrate |
| (2) High temperature | Color tint changed due to large gap | Color tint changed due to large gap | ○ | ○ | ○ | ○ | ○ |
| (3) Low temperature | ○ | ○ | ○ | ○ | ○ | Air bubble generated | Air bubble generated |

Table 2 evaluates how the performance of a finished LCD changed as a result of under-pressure hole sealing being performed at each value of the under-pressure hole sealing load for each environmental temperature of (1) ordinary temperature, (2) High temperature (for example, 70–80° C.), and (3) Low temperature (for example, −10° C. through −20° C.), thus giving a ○ mark to the case where this finished LCD is unproblematic as a commercial product.

spacer 30 is sufficiently compressed already as mentioned above, as shown in FIG. 5B the columnar spacer 30 can shrink more than the liquid crystal 3 possibly does, so that as shown in FIG. 5C the columnar spacer 30 can keep pace with the liquid crystal 3 in shrinkage As a result, a gas, if contained in the liquid crystal 3, does not give rise to air bubbles Thus, by applying an optimal under-pressure hole sealing load in the under-pressure hole sealing processing, even when the environment in which a finished LCD is used is exposed to a high or low temperature other than the ordinary temperature, the columnar spacer 30 can keep pace with the liquid crystal 3 in expansion and shrinkage, thus making it easy to form a uniform gap.

In the subsequent processes, according to almost the same method as an ordinary LCD manufacturing method, a polarizing plate (not shown) is formed outside the first transparent substrate 5 of the TFT substrate 1 and the second transparent substrate 21 of the CF substrate 2 to then connect a peripheral driver circuit (not shown) to the liquid crystal cell, thus completing the LCD.

Table 3 shows how the columnar spacer 30 formed beforehand changes in height as affected by the hear or the load by the main processes in an LCD manufactured by the above-mentioned manufacturing processes.

TABLE 3

| Main process | Process conditions | Actual height measurement | Amount of change from previous process | Rate of amount of change from previous process (%) |
|---|---|---|---|---|
| Initial stage of CF | — | 4.45 | — | — |
| After PI application | — | 4.50 | 0.05 | 1.1 |
| After PI baking | 230° C. 1 h | 4.29 | −0.21 | −4.7 |
| After seal baking | 0.46 kg/cm$^2$ | 4.15 | −0.14 | −3.3 |
| After panel disassembly | | 4.13 | −0.02 | −0.5 |
| Total deformed amount | | — | −0.37 | −8.2 |

As is clear from the Table 3, the columnar spacer 30 is affected little by the heat or the load from each of the main processes; in fact, its initial height in formation decreased only by about 8.2% finally. It means that this embodiment makes it possible to maintain the gap in a stable manner.

Thus, by the LCD manufacturing method according to this embodiment, the columnar spacer 30 is formed to maintain a gap between the TFT substrate 1 and the CF substrate 2 which is to be filled with the liquid crystal 3, to then perform the under-pressure hole sealing processing that determines the gap finally under an under-pressure hole sealing load value of 0.15–0.60 kg/cm$^2$, so that even when an environment in which a finished LCD is used is exposed to a high or low temperature other than the ordinary temperature, the columnar spacer 30 can keep pace with the liquid crystal in expansion and shrinkage, thus making it easy to make the gap Uniform Therefore, it is possible to form a stable gap by use of the columnar spacer 30 and also to manufacture a high-quality LCD.

Second Embodiment

Figure 8A:
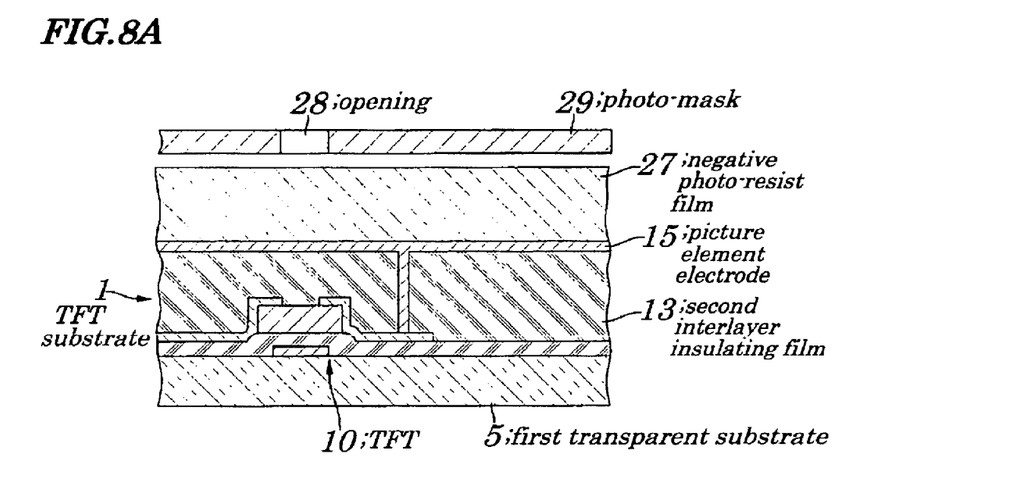
FIGS. 8A and 8B are flow diagrams for showing sequential steps of the LCD manufacturing method according to a second embodiment of the present invention.
Figure 8B:
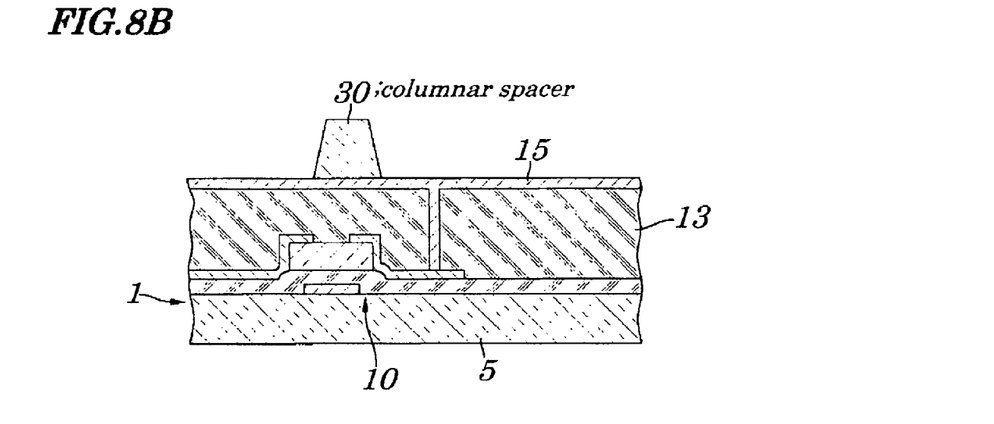

As shown in FIGS. 9A and 8B, an LCD manufacturing method according to a second embodiment differs greatly from that according to the above-mentioned first embodiment in that a columnar spacer 30 is formed on a TFT substrate 1.

That is, by the LCD manufacturing method according to this embodiment, as shown in FIG. 8A, first the TFT substrate 1 on which a TFT 10 is formed beforehand is provided, and a negative photo-resist film 27 mainly including an acrylic resin is applied throughout such a side surface of the TFT substrate 1 as to face a CF substrate (not shown) and then covered by a photo-mask 29 having an opening 28 formed therein at a position where the columnar spacer 30 is to be formed. Next, ultraviolet ray is applied through the photo-mask 29 for exposure and then the photo-mask 29 is removed.

Next, the TFT substrate 1 is dipped into a developer to develop the negative photo-resist film 27 in order to remove the negative photo-resist film 27 other than those portions thereof that were irradiated with ultra-violet ray through the opening 28 in the photo-mask 29, thus forming the columnar spacer 30 as shown in FIG. 8B. This columnar spacer 30 is formed as fixed on a picture element electrode 15. Specifically, the columnar spacer 30 is formed outside the display picture elements in order not to affect the optical transparency like in the case of forming it on the CF substrate 2.

The subsequent processes may be repeated almost the same way as described with the first embodiment. The description of these processes, therefore, is omitted.

Thus, by this embodiment, almost the same effects can be obtained as those by the first embodiment.

It is apparent that the present invention is not limited to the above embodiments but may be changed and modified without departing from the scope and spirit of the invention. For example, although the embodiments have been described with reference to the example in which a TFT is used as a driver element to drive liquid crystal, the driver element is not limited to the TFT; for example, such a two-terminal element may be used as an MIS (Metal Insulator Metal)-type element, a diode type element, a varistor-type elements, or a like. Also, although the embodiments have been described with reference to the example of a transparent LCD in which a transparent substrate made of glass or a like is used as the driver element substrate, it is not limited to a transparent ones for example, an opaque substrate made of poly-silicon or a like may be used. In this case, the LCD becomes a reflection-type one, in which the picture element electrode operates as a reflection electrode serving also as a reflection plate.

Also, although the color filter has been formed on the facing substrate in the embodiments, it may be formed on the driver element substrate. Also, the present invention is applicable to both the TN (Twisted Nematic)-type and IPS (In-Plane Switching)-type LCDs.

What is claimed is:

1. A method for manufacturing an LCD comprising a driver element substrate on which a driver element is formed and a facing substrate which faces said driver element substrate, into a gap between which is injected liquid crystal, a columnar spacer for maintaining said gap being disposed between said driver element substrate and said facing substrate, comprising:

a columnar spacer forming step for forming said columnar spacer on either one of said driver element substrate or said facing substrate;

a seal forming step for forming a seal for adhering said driver element substrate and said facing substrate to each other after said columnar spacer is formed;

a liquid crystal injecting step for injecting said liquid crystal through an injection hole formed in said seal beforehand after said driver element substrate and facing substrate are adhered to each other by said seal; and an under-pressure hole sealing step for sealing said injection hole after an extra amount of said liquid crystal is expelled through said injection hole, to then apply an under-pressure hole sealing load value of at least 0.15 and less than 0.60 kg/cm$^2$ across said driver element substrate and facing substrate in order to determine said gap finally.

2. The method according to claim 1, wherein between said seal forming step and said liquid crystal injecting step is interposed a superposing step for applying a superposing load value of 0.03–0.12 kg/cm$^2$ across said driver element substrate and said facing to press and crush said seal in order to adhere said driver element substrate and said facing substrate to each other.

3. The method according to claim 2, wherein said superposing step is followed by a seal baking step for baking said seal by applying across said driver element substrate and said facing substrate a seal baking load value less than said under-pressure hole sealing load value employed in said under-pressure hole sealing step.

4. The method according to claim 1, wherein said columnar spacer forming step is followed by an oriented film forming step for forming an oriented film to cover said columnar spacer.

5. The method according to claim 4, wherein said oriented film forming step is followed by an oriented film baking step for baking said oriented film to remove a solvent therefrom.

6. The method according to claim 5, wherein said oriented film baking step is performed at a temperature of 150–230° C. for one to three hours.

7. The method according to claim 1, wherein said columnar spacer forming step is performed by applying a photo-resist film on said either one of said driver element substrate or said facing substrate to then pattern said photo-resist film into a desired shape.

8. The method according to claim 7, wherein said photo-resist film employed is of a negative type.

9. The method according to claim 1, wherein said columnar spacer is formed in a light-blocking region.

10. The method according to claim 9, wherein a position of said light-blocking region is selected in a region where a black matrix layer is formed.

* * * * *